(12) United States Patent
Yun et al.

(10) Patent No.: US 6,904,188 B1
(45) Date of Patent: Jun. 7, 2005

(54) ACOUSTO-OPTIC TUNABLE FILTER HAVING IMPROVED WAVE-DAMPING CAPABILITY

(75) Inventors: Seok-Hyun Yun, Santa Clara, CA (US); In-Kag Hwang, Sunnyvale, CA (US); Kwan Il Lee, Sunnyvale, CA (US); Hyo-Sang Kim, Santa Clara, CA (US); Pavel G. Polynkin, Fremont, CA (US); Helge E. Engan, Santa Clara, CA (US); Wayne V. Sorin, Mountain View, CA (US)

(73) Assignee: Novera Optics, Inc., Palo Alto, CA (US)

( * ) Notice: Subject to any disclaimer, the term of this patent is extended or adjusted under 35 U.S.C. 154(b) by 66 days.

(21) Appl. No.: 10/072,511

(22) Filed: Feb. 5, 2002

Related U.S. Application Data

(60) Provisional application No. 60/276,753, filed on Mar. 16, 2001.

(51) Int. Cl.[7] .............................................. G02F 1/335
(52) U.S. Cl. ........................... 385/7; 359/308; 359/285
(58) Field of Search ............................... 385/7; 359/308, 359/285, 286, 305

(56) References Cited

U.S. PATENT DOCUMENTS

| | | | |
|---|---|---|---|
| 4,068,191 A | | 1/1978 | Zemon et al. |
| 4,781,425 A | | 11/1988 | Risk et al. |
| 4,828,350 A | | 5/1989 | Kim et al. |
| 4,832,437 A | | 5/1989 | Kim et al. |
| 4,915,468 A | | 4/1990 | Kim et al. |
| 4,971,417 A | | 11/1990 | Krinsky et al. |
| 5,007,705 A | | 4/1991 | Morey et al. |
| 5,022,732 A | * | 6/1991 | Engan et al. .................. 385/28 |
| 5,455,877 A | * | 10/1995 | Baran et al. .................. 385/11 |
| 5,708,736 A | | 1/1998 | Steinblatt |
| 6,021,237 A | | 2/2000 | Kim et al. |
| 6,151,157 A | | 11/2000 | Ball et al. |
| 6,151,427 A | | 11/2000 | Satorius |
| 6,233,379 B1 | | 5/2001 | Kim et al. |
| 6,253,002 B1 | | 6/2001 | Kim et al. |
| 6,266,462 B1 | * | 7/2001 | Kim et al. .................... 385/28 |
| 6,343,165 B1 | | 1/2002 | Kim et al. |
| 6,510,261 B2 | | 1/2003 | Sorin et al. |
| 6,539,148 B1 | | 3/2003 | Kim et al. |
| 6,631,224 B2 | | 10/2003 | Sorin et al. |
| 6,640,027 B2 | | 10/2003 | Kim et al. |

OTHER PUBLICATIONS

J.N. Blake, B.Y. Kim, H.E. Engan, and H.J. Shaw, "Analysis of intermodal coupling in a two-mode fiber with periodic microbends," Optics Letters, vol. 12, No. 4, pp. 281–283 (Apr. 1987).

(Continued)

*Primary Examiner*—Edward J. Glick
*Assistant Examiner*—Krystyna Suchecki
(74) *Attorney, Agent, or Firm*—Blakely, Sokoloff, Taylor & Zafman LLP

(57) ABSTRACT

This invention relates to an acousto-optical tunable filter generally of the kind described in U.S. Pat. No. 6,266,462. More specifically, the invention relates to a filter and its construction, the filter including a support, first and second mounts at spaced locations on the support, an optical fiber having first and second mounted portions secured to the first and second mounts respectively and a filtering section between the first and second mounted portions, a signal generator operable to generate a periodic signal, and an electro-acoustic transducer having a terminal connected to the signal generator and an actuating portion, the electric signal causing vibration of the actuating portion, and the actuating portion being connected to the filtering section so that the vibration generates a transverse wave traveling along the filtering section. The filter has an improved damper to more effectively dampen waves traveling along the filtering section.

21 Claims, 7 Drawing Sheets

OTHER PUBLICATIONS

B.Y. Kim, J. N. Blake, H.E. Engan, and H.J. Shaw, "Acousto-optic frequency-shifting in two-mode optical fibers," OFS '86, Tokyo, Japan (Oct. 8–10, 1986).

H.E. Engan, B.Y. Kim, J.N. Blake, and H.J. Shaw, "Propagation and optical interaction of guided acoustic waves in two-mode optical fibers," Journal of Lightwave Technology, vol. 6, No. 3, pp. 428–436 (Mar. 1988).

J. O. Askautrud and H.E. Engan, "Fiber-optic frequency shifter with no mode change using cascaded acoustic-optic interaction regions," Optics Letters, vol. 15, No. 11, pp. 649–651 (Jun. 1, 1990).

H.E. Engan, T. Myrtveit, and J.O. Askautrud, "All-fiber acousto-optic frequency shifter excited by focused surface acoustic waves," Optics Letters, vol. 16, pp. 24–26 (Jan. 1, 1991).

H.E. Engan, D. Ostling, P.O. Kval, and J.O. Askautrud, "Wideband operation of horns for excitation of acoustic modes in optical fibers," Proc. OFS (10), Glasgow, Oct. 11th–13th, 1994, pp. 568–571 (SPIE Proc. 2360).

D. Ostling and H.E. Engan, "Narrow-band acoustio-optic tunable filtering in a two-mode fiber," Optics Letters, vol. 20, No. 11, pp. 1247–1249 (Jun. 1, 1995).

H.E.Engan, "Analysis of polarization mode coupling by acoustic torsional waves in optical fibers," J. Opt. Soc. Am. A., vol. 13, No. 1, pp. 112–118 (Jan. 1996).

D Ostling and H.E. Engan, "Spectral flattening by an all-fiber acousto-optic tunable filter," 1995 IEEE Ultrasonics Symposium, pp. 837–840.

D. Ostling and H.E. Engan, "Broadband spatial mode conversion by chirped fiber bending," Optics Letters, vol. 21, No. 3, pp. 192–194 (Feb. 1, 1996).

D. Ostling and H.E. Engan, "Polarization-selective mode coupling in two-mode Hi-Bi fibers," Journal of Lightwave Technology, vol. 15, No. 2, pp. 312–320 (Feb. 1997).

H.E. Engan, "Acoustic torsional waves used for coupling between optical polarization modes in optical fibers," 1996 IEEE Ultrasonics Symposium, pp. 799–802.

D. Ostling and H.E. Engan, "Acousto-optic tunable filters in two-mode fibers," Optical Fiber Technology, vol. 3, pp. 177–183 (1997).

B. Langli, P.G. Sinha, and K. Blotekjaer, "Acousto-Optic Mode Coupling of Partially Coherent Light in Two-Mode Fibers," Optical Review, vol. 4, No. 1A, pp. 121–129, Jan./Feb. 1997.

T.A. Birks, P.S.J. Russell, and C.N. Pannell, "Low power acousto-optic device based on a tapered single-mode fiber," IEEE Photonics Technology Lett., vol. 6, No. 6, pp. 725–727 (Jun. 1994).

M. Berwick and D.A. Jackson, "Coaxial optical-fiber frequency shifter," Optics Letters, vol. 17, No. 4, pp. 270–272 (Feb. 15, 1992).

W.P. Risk and G.S. Kino, "Acousto-optic fiber-optical frequency shifter using periodic contact with a copropagating surface acoustic wave," Optics Letters, vol. 11, No. 5, pp. 336–338 (May 1986).

W.P. Risk and G.S. Kino, "Acousto-optic polarization coupler and intensity modulator for berefringent fiber," Optics Letters, vol. 11, No. 1, pp. 48–50 (Jan. 1986).

W.P. Risk, G.S. Kino, and B.T. Khuri-Yakub, "Tunable optical filter in fiber-optic form," Optics Letters, vol. 11, No. 9, pp. 578–580 (Sep. 1986).

S.F. Su, R. Olshansky, D.A. Smith, and J.E. Baran, "Flattening of erbium-doped fibre amplifier gain spectrum using an acousto-optic tunable filter," Electron Letters, vol. 29, No. 5, pp. 477–478 (Mar. 4, 1993).

Yijiang Chen, "Acousto-optic frequency shifter using coaxial fibers," Optical and Quant. Electronics, vol. 21, pp. 491–498 (1989).

J. Ji, D. Uttam, and B. Culshaw, "Acousto-optic frequency shifting in ordinary single-mode fibre," Electronics Letters, vol. 22, No. 21, pp. 1141–1142 (Oct. 9, 1986).

C.N. Pannell, R.P. Tatam, J.D.C. Jones, and D.A. Jackson, "Optical frequency shifter using linearly birefringent monomode fibre," Electronics Letters, vol. 23, No. 16, pp. 847–848 (Jul. 30, 1987).

K. Nosu, H.F. Taylor, S.C. Rashleigh, and J.F. Weller, "Acousto-optic phase modulator and frequency shifter for single-mode fibers," 1983 Ultrasonics Symposium, pp. 476–481 (1983).

B.Y. Kim, et al., "All-Fiber Acousto-Optic Frequency Shifter," Optics Letters, vol. 11, No. 6, pp. 389–391 (Jun. 1986).

H.E. Engan, et al., "Propagation and Optical Interaction of Guided Acoustic Waves in Two-Mode Optical Fibre," IEEE Journal of Lightwave Technology, vol. 6, No. 3, pp. 428–436 (Mar. 1988).

S.H. Yun, et al., "All-fiber Tunable Filter and Laser Based on Two-Mode Fiber," Optics Letters, vol. 21, No. 1, pp. 27–29 (Jan. 1996).

M.Y. Jeon, et al., "An Electronically Wavelength-Tunable Mode-Locked Fiber Laser Using an All-Fiber Acoustooptic Tunable Filter," IEEE Photonics Technology Letters, vol. 8, No. 12, pp. 1618–1620 (Dec. 1996).

H.S. Kim, et al., "All-fiber acousto-optic tunable notch filter with electronically controllable spectral profile," Optics Letters, vol. 22, No. 19, pp. 1476–1478 (Oct. 1, 1997).

S.H. Yun, et al., "Wavelength-Swept Fiber Laser with Frequency Shifted Feedback and Resonantly Swept Intra-Cavity Acoustooptic Tunable Filer," IEEE Journal of Selected Topics in Quantum Electronics, vol. 3, No. 4, pp. 1087–1096, Invited Paper (Aug. 1997).

H.S. Kim, et al., Actively gain-flattened Erbium-Doped Fiber Amplifier Over 35nm by Using All-Fiber Acoustooptic Tunable Filters, IEEE Photonics Technology Letters, vol. 10, No. 6, pp. 790–792 (Jun. 1998).

S.H. Yun, et al., "Dynamic Erbium-Doped Fiber Amplifier Based on Active Gain Flattening with Fiber Acoustooptic Tunable Filters," IEEE Photonics Technology Letters, vol. 11, No. 10, pp. 1229–1231 (Oct. 1999).

H.E. Engan, et al., "Optical Frequency Shifting in Two-Mode Optical Fibers by Flexural Acoustic Waves," IEEE 1986 Ultrasonics Symposium, pp. 435–438 (Nov. 17–19, 1986).

S.H. Yun, et al., "All-Fiber Acousto-Optic Tunable Filter," OFC '95, San Diego, California, pp. 186–187 (Feb. 26–Mar. 3, 1995).

S.H. Yun, et al., "Electronically Tunable Fiber Laser Using All-Fiber Acousto-Optic Tunable Filter," IOOC '95, (10th International Conference on Integrated Optics and Optical Fibre Communication), Hong Kong, pp. 22–23 (Jun. 26–30, 1995).

M.Y. Jeon, et al., "Harmonically Mode-Locked Fiber Using an All-Fiber Acousto-Optic Tunable Filter," OFC '97, Dallas, Texas, pp. 166–167 (Feb. 16–22, 1997).

S.H. Yun, et al., "Fiber grating sensor array demodulation using wavelength–swept fiber laser," OFS–12, Williamsburg, Virginia, pp. 658–661 (Oct. 28–31, 1997).

H.S. Kim, et al., "Dynamic gain equalization of erbium–doped filter amplifier with all–fiber–acousto–optic tunable filters," OFC '98, WG4, San Jose, California, USA, pp. 136–138 (Feb. 22–27, 1998).

Y.W. Koh, et al., "Broadband Polarization–Insensitive All–Fiber Acousto–Optic Modulator," OFC '98, WM50, San Jose, California, USA, vol. 2, pp. 239–240 (Feb. 22–27, 1998).

K. Oh, et al., "Characterization of elliptic core fiber acousto–optic tunable filters operated in the single mode and the multi–mode range," OFC '98, WM59, San Jose, California, USA, vol. 2, pp. 250–251 (1998).

B.Y. Kim, et al., "Fiber Based Acousto–Optic Filters," OFC/IOOC '99, San Diego, California, USA, pp. 199–201, Invited Paper (Feb. 21–26, 1999).

B.Y. Kim, "Acousto–Optic Components for WDM Application," IEEE/LEOS Summer Topical Meetings, San Diego, California, USA, pp. 47–48, Invited Paper (Jul. 26–28, 1999).

B.Y. Kim, "Acousto–Optic filters for fiber systems," ICO–128, San Francisco, California, USA, pp. 92–93, Invited Paper (Aug. 2–6, 1999).

O. Lisboa, et al., "New configuration for an optical fiber acousto–optic frequency shifter," Proc. Soc. Photo–Opt. Instrum. Eng., vol. 1267, pp. 17–23 (Mar. 13–14, 1990).

D.O. Culverhouse, et al., "Four port fused taper acousto–optic device using standard single mode telecommunication fiber," Electronic Letters, vol. 31, No. 15, pp. 1279–1280 (Jul. 20, 1995).

D.O. Culverhouse, et al., "Low–loss all–fiber acousto–optic tunable filter," Optics Letters, vol. 22, No. 2, pp. 96–98 (Jan. 15, 1997).

T.E. Dimmick, et al., "Compact all–fiber acoustooptic tunable filters with small bandwidth–length product," IEEE Photonics Technology Letters, vol. 12, No. 9, pp. 1210–1212 (Sep. 2000).

G. Kakarantzas, et al., "High strain–induced wavelength tunability in tapered fibre acousto–optic filters," Electronics Letters, vol. 36, No. 14, pp. 1187–1188 (Jul. 6, 2000).

T.E. Dimmick, et al., "Narrow–band acousto–optic tunable filter fabricated from highly uniform tapered optical fiber," Optical Fiber Communication Conference 2000, vol. 37, pp. 25–27 (Mar. 7–10, 2000).

T.A. Birks, et al., "Control of bandwidth in fiber acousto–optic tunable filters and other single–mode null coupler devices," CLEO, 1997, vol. 11, pp. 444–445 (1997).

T.A. Birks, et al., "The acousto–optic effect in single–mode fiber tapers and couplers," Journal of Lightwave Technology, vol. 14, No. 11, pp. 2519–2529 (Nov. 1996).

D.O. Culverhouse, et al., "All–fibre Acousto–optic Tunable Filter Based on a Null Coupler," Optical Communication 1996, ECOC '96, vol. 3, pp. 317–320 (Sep. 15–19, 1996).

W.F. Liu, et al., "100% efficient narrow–band acoustooptic tunable reflector using fiber Bragg grating," Journal of Lightwave Technology, vol. 16, No. 11, pp. 2006–2009 (Nov. 1998).

F. Tian, et al., "Interchannel Interference in Multiwavelength Operation of Integrated Acousto–Optical Filters and Switches," Journal of Lightwave Technology, vol. 13, No. 6, pp. 1146–1154 (1995).

T.E. Dimmick, D.A. Satorius, and G.L. Burdge, "All–Fiber Acousto–Optic Tunable Bandpass Filter," Optical Society of America 2000, 3 pages total (2000).

M.Y. Jeon, et al., "An Electronically Wavelength–Tunable Mode–Locked Fiber Laser Using an All–Fiber Acousto–Optic Tunable Filter," Proceedings of the 10th International Conference, Del Coronado, CA, pp. 20–21 (May 28 –Jun. 1, 1996).

H.S. Kim, S.H. Yun, I.K. Hwang, and B.Y. Kim, "Single–mode–fiber acousto–optic tunable notch filter with variable spectral profile," Conference on Optical Fiber Communications, 1997 OSA Technical Digital Series, vol. 6, pp. 395–398 (Feb. 16–21, 1997).

* cited by examiner

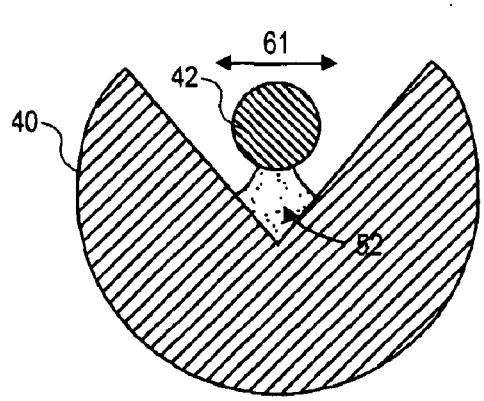
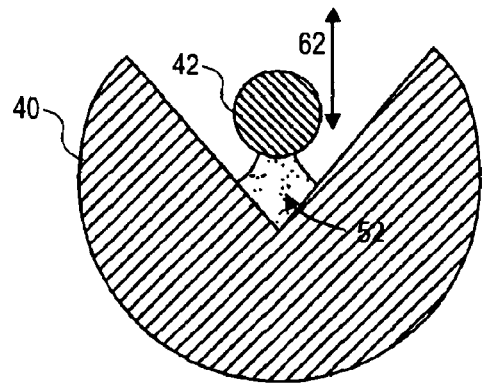
FIG. 7A  FIG. 7B
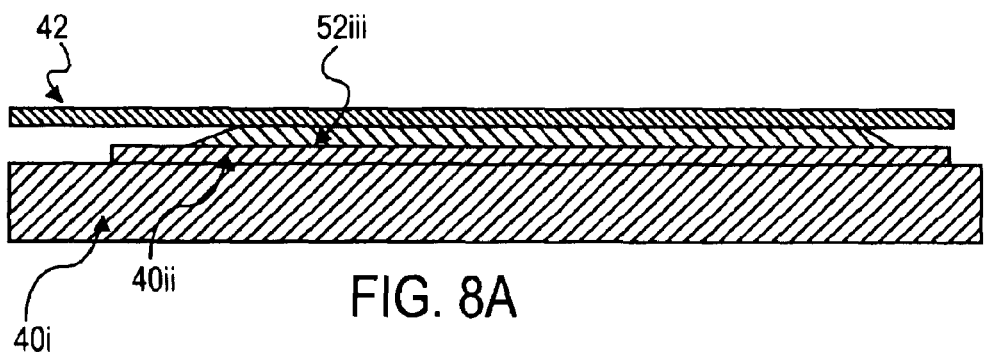
FIG. 8A
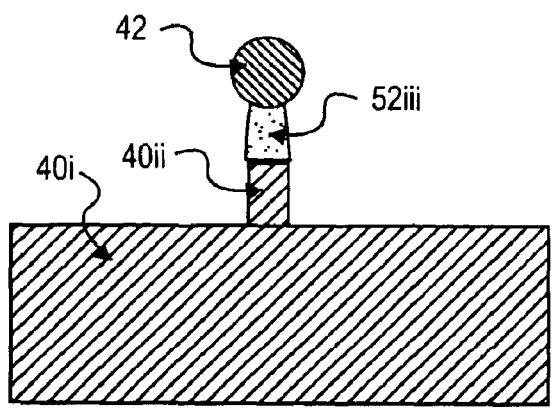
FIG. 8B

ACOUSTO-OPTIC TUNABLE FILTER HAVING IMPROVED WAVE-DAMPING CAPABILITY

CROSS-REFERENCES

Priority is claimed from U.S. Provisional Patent Application No. 60/276,753 filed on Mar. 16, 2001.

BACKGROUND OF THE INVENTION

1. Field of the Invention

This invention relates to an acousto-optic tunable filter.

2. Discussion of Related Art

As an optical signal traverses an optical network, the signal is subject to losses and nonlinear effects that result in signal attenuation and distortion. Amplifiers, such as erbium-doped fiber amplifiers ("EDFA's"), are typically placed approximately every 80 kilometers along an optical fiber to boost signal strength. However, such amplifiers impose their own distortions on the signal power spectral distribution (as a function of wavelength). One of the major distortions is caused by the non-uniform gain profile (as a function of wavelength) of the amplifiers, which imposes a non-uniform spectral distribution on the amplified signals. It is especially important in wavelength division multiplexed ("WDM") networks to maintain a uniform spectral distribution across all channels.

Static filters are often used to attenuate the signal power as a function of wavelength to achieve a substantially uniform power distribution. Static filters, however, cannot adapt to dynamically changing conditions such as amplifier aging, temperature variations, channel add/drop, fiber loss and other changes in components along the transmission line. Moreover, the required filter shape is dependent upon system configuration, e.g., the spacing between amplifiers. Static filter characteristics cannot be modified to compensate for these changes without replacing the filter itself.

To overcome these problems, it is known in the art to employ dynamic wavelength tunable filters to flatten or equalize the signal spectrum, as well as to obtain any desired spectral shape. One such filter is an all-fiber acousto-optic tunable filter ("AOTF") described in U.S. Pat. No. 6,233,379, entitled "Acousto-optic filter," which is assigned to the assignee of the present invention and incorporated by reference herein. As described in the patent, the all-fiber AOTF is a multiple-notch filter, with a transfer function characterized by notch depth and center frequency (or wavelength).

The ATOF has a piezoelectric transducer that vibrates a conical wave propagation member. A tip of the conical wave propagation member vibrates an optical fiber. Transverse flexural waves are created in the optical fiber that filter certain wavelengths of light from a core into a cladding layer of the optical fiber.

One problem with the AOTF is that the wave is reflected back to the conical wave propagation member. Such a reflection interferes with the wave traveling from the conical wave propagation member, resulting in a modification microbending of the optical fiber. The modified microbending, in turn, creates modifications in wavelengths and/or magnitude of light that couples from the core into the cladding, and results in undesirable filtering characteristics.

SUMMARY OF THE INVENTION

This invention relates to an acousto-optic tunable filter generally of the kind described in U.S. Pat. No. 6,266,462. More specifically an optical fiber has first and second mounted portions secured to first and second mounts respectively and an interaction length between the first and second mounted portions. A signal generator is operable to generate a periodic signal. An electro-acoustic transducer has a terminal connected to the signal generator and an actuating portion. The electric signal causes vibration of the actuating portion, and the actuating portion is connected to the interaction length so that the vibration generates an acoustic wave traveling along the interaction length. Such a filter has the ability to reduce an amplitude of one or more selected wavelengths of light as it travels through the interaction length.

A damper may be located at an end of the interaction length. The damper serves to at least partially dampen a wave or waves traveling through the interaction length.

According to one aspect of the invention, the damper has a continuous slanted surface at an angle other than 90° relative to a longitudinal axis of the optical fiber. Such a slanted surface is easy to create by depositing a damping material and allowing the damping material to flow under capillary action and gravity. An advantage of such a slanted surface is that it is more effective in not reflecting a wave than the surface located at right angles relative to a longitudinal axis of the interaction length.

According to a further aspect of the invention, a first reflected wave is created by a transition from the interaction length to the damper component and at least a second reflected wave is created. The second reflected wave may have an amplitude and phase which are selected so that it substantially cancels the first reflected wave. A damping effect is created by a cancellation of the waves.

BRIEF DESCRIPTION OF THE DRAWINGS

The invention is further described by way of example with reference to the accompanying drawings wherein:

FIGS. 7A and 7B are cross sectional end views of a filter with a damper according to an alternative embodiment;

FIGS. 8A and 8B are cross-sectional end views of a filter with a damper according to a further embodiment;

DETAILED DESCRIPTION OF THE INVENTION

Figure 1:
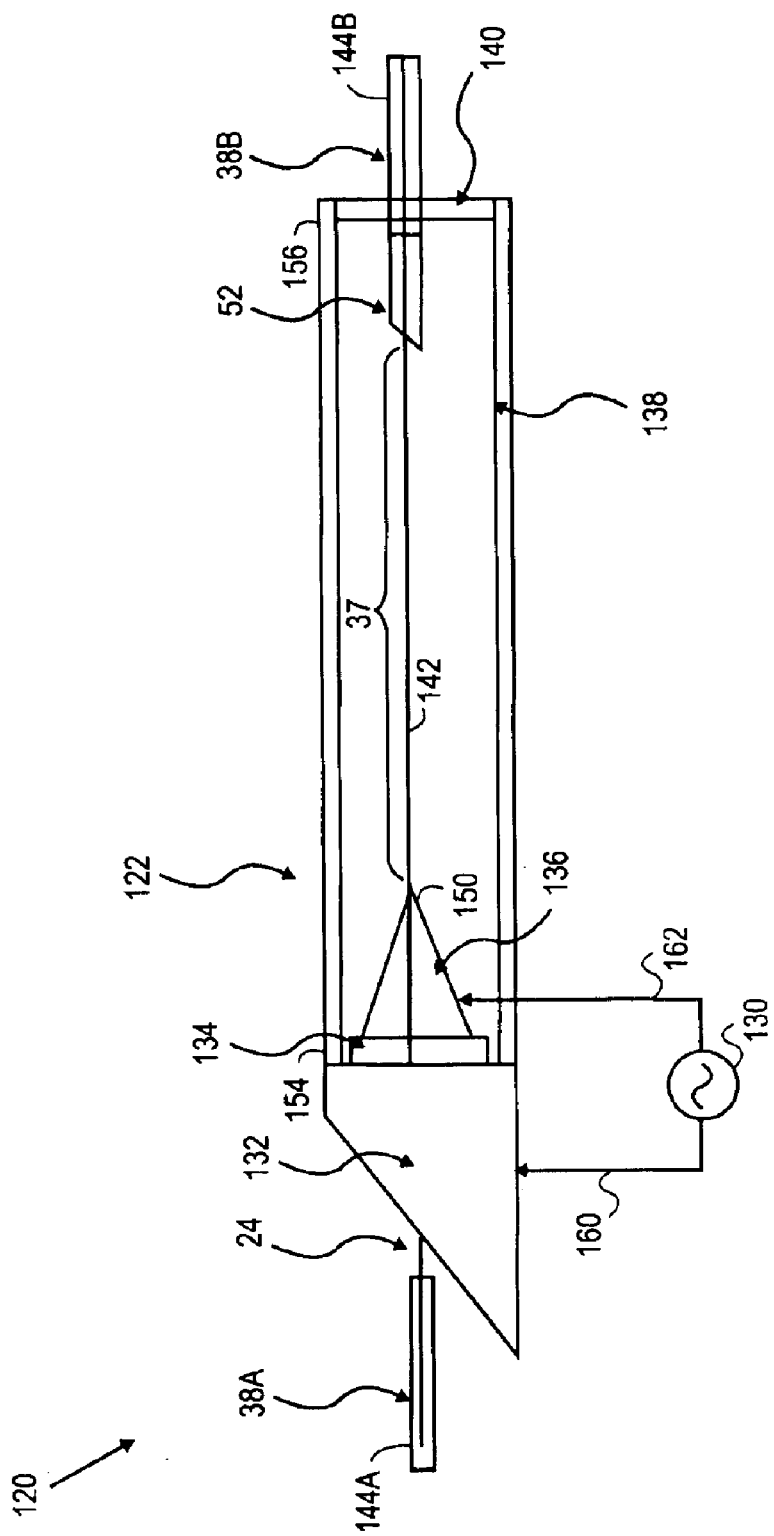
FIG. 1 is a cross-sectional side view of an acousto-optic tunable filter according to an embodiment of the invention.
Figure 2:
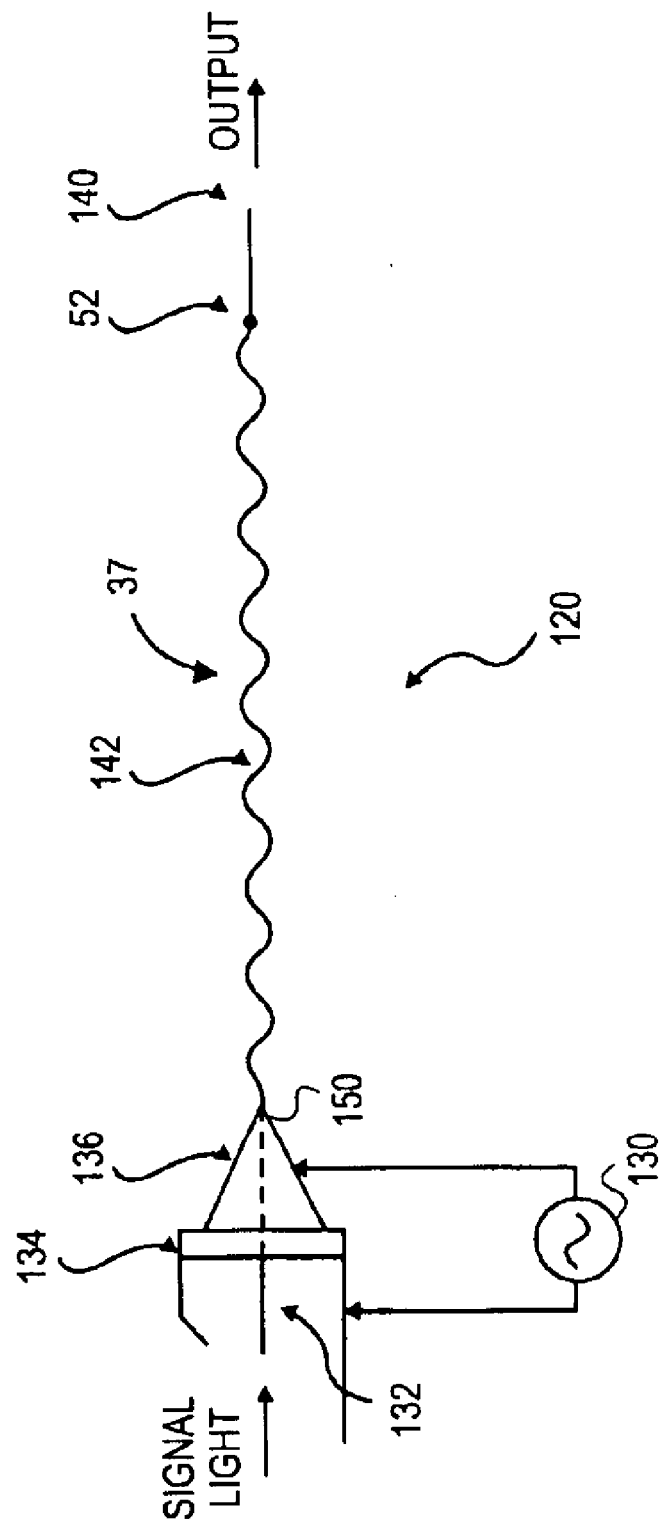
FIG. 2 is a side view illustrating functioning of the filter.

FIG. 1 of the accompanying drawings illustrates an acousto-optic tunable filter 120 constructed according to an embodiment of the invention. The filter 120 is of the kind described in the U.S. Pat. No. 6,266,462 filed on Oct. 22, 1999, the subject matter of which is incorporated herein by reference. The filter 120 includes a mounting construction 122, an optical fiber construction 24, and an electrical signal generator 130.

The mounting construction 122 includes a heat sink 132, a piezo-electric transducer 134, an acoustic wave propagation member 136, an outer tube arrangement 138, and an end plug 140.

Metal electrode terminals are formed on opposing surfaces of the piezo-electric transducer 134. One terminal is located against the heat sink 132 and attached to the heat sink 132. A base of the acoustic wave propagation member 136 is then attached to an opposing terminal of the piezo-electric transducer 134.

The optical fiber construction 24 includes an optical fiber 142 consisting of a core and a surrounding cladding layer (not shown), which is covered with a jacket 144. A central section of the jacket 144 is removed so that only portions 144A and 144B of the jacket at opposing ends of the optical fiber 142 remain.

Openings are made in the heat sink 132, piezo-electric transducer 134, and acoustic wave propagation member 136 to form a continuous passage. The end of the optical fiber construction 24 having the first portion 144A of the jacket is inserted through the opening of the acoustic wave propagation member 136, whereafter it is inserted through the openings in the piezo-electric transducer 134 and the heat sink 132.

The second portion 144B of the jacket is then located in a groove in the end plug 140. A resin is then placed in the groove and allowed to cure, thereby securing the second portion 144B of the jacket to the end plug 140

Resin is also applied to the fiber 24 where it protrudes from a tip 150 of the acoustic wave propagation member 136, and flows into the tip 150 of the acoustic wave propagation member 136. The resin then cures and secures the fiber 24 to the tip 150 of the acoustic wave propagation member 136.

A damper 52 is located on the optical fiber 142. The damper 52 is coaxially disposed on the optical fiber construction 24 adjacent to the second portion 144B of the jacket. The length of exposed fiber from the tip 150 to the end of the damper 52 nearest the tip 150 is the "interaction length 37" of the filter. Generally, the interaction length or "interaction region" is the length of fiber in which light is coupled from one mode to another, and, more particularly in this case, the portion of the optical fiber 142 not covered by the damper 52.

An end 154 of the outer tube arrangement 138 is then located over the second portion 144B of the jacket and moved over the end plug 140 until it contacts a surface of the heat sink 132. A second, opposing end 156 of the outer tube arrangement 138 is located over the end plug 140. The positioning of the end plug 140 is then adjusted within the end 156. By adjusting the positioning of the end plug 140, the interaction length 37 of the optical fiber 142 is tensioned by about 0.2 N to eliminate slack, while simultaneously compressing the outer tube arrangement 138. When a predetermined tension in the interaction length 37 is reached, a resin is applied to an interface between the end plug 140 and the end 156. The resin is allowed to cure, thereby securing the end plug 140 stationarily within the end 156. The tension of the interaction length 37 is thereby set.

The signal generator is connected to the transducer 134 through leads 160 and 162. The lead 160 couples to the heat sink 132, which is itself electrically coupled to a terminal on one face of the transducer 134. The lead 162 is electrically connected to the opposing face of the transducer 134, either directly to the terminal on the opposing face, or indirectly through the acoustic wave propagation member 136. The heat sink 132 and the acoustic wave propagation member 136 can be made of conductive aluminum so that the terminals on the opposing sides of the piezoelectric transducer 134 are at the voltages of the leads 160 and 162, respectively. A voltage potential is thereby created across the piezoelectric transducer 134.

The signal generator 130 applies across the piezoelectric transducer 134 a voltage at one or more frequencies in the range of 0–20 MHz, or more particularly, 0–3 MHz. The voltage signal applied across the piezo-electric transducer 134 causes opposing surfaces of the piezoelectric transducer 134 to vibrate relative to one another in a direction transverse to a longitudinal axis of the interaction length 37. Adjusting the frequency and amplitude of the electrical signal applied to the transducer results in a corresponding change in the frequency and amplitude, respectively, of the mechanical vibration of the transducer. Those skilled in the art will recognize that the invention may employ acoustic wave exciters other than the acoustic wave exciter formed from the combination of the signal generator 130, transducer 134, and acoustic wave propagation member 136 described herein.

Vibrations of opposing surfaces of the piezo-electric transducer 134 are transferred through the acoustic wave propagation member 136 to the tip 150 thereof. The tip 150 vibrates periodically in response to the change in the voltage. Movement of the tip 150 is transferred to the end of the interaction length 37 closest to the tip 150.

FIG. 8 illustrates how vibration of the tip 150 imparts acoustic waves in the interaction length 37. In the present example, the waves are y-direction transverse flexural waves that travel along the interaction length 37 from the tip 150 to the damper 52. The damper 52 is designed to absorb the waves or otherwise minimize reflection of the waves back to the tip 150. The creation of a standing wave is thereby prevented.

In use, the filter 120 is inserted into a fiber optic transmission line. A light signal is transmitted through the core of the optical fiber 142. The light signal may be modulated as a WDM signal having many channels, each at a different wavelength. For various reasons, including the non-uniform gain profiles of amplifiers along the fiber optic transmission line, the intensity of light may differ from channel to channel at the point where the light enters the optical fiber 142 of the filter 120.

The effect of the acoustic waves in the interaction length 37 is that the intensity of selected wavelengths of light traveling through the interaction length 37 is attenuated by coupling these wavelengths from a mode in the core into one or more modes in the cladding of the interaction length 37. This coupling creates a notch in the transmission spectrum centered at each selected wavelength. By changing the frequency of the applied electrical signal, and thus the frequency of the acoustic waves in the interaction length 37, the center wavelength of the notch can be altered. Furthermore, by changing the magnitude of the applied voltage (and thereby the magnitude of the acoustic wave), the depth of the notch (representing the amount of light coupled to the other mode) can be changed. By cascading multiple acoustic exciter/interaction length combinations and/or applying multiple acoustic frequencies with each exciter, a combination of notches of different optical center frequencies and depths may be achieved, thereby allowing creation of a desired filter transfer-function as described in U.S. Pat. No. 6,266,462. Such a filter may be employed for gain equalization purposes. Those skilled in the art will recognize that, as an alternative to coupling light between core and cladding modes, an AOTF may also couple light between different core modes. Further details of the functioning of the filter 120 are described in U.S. Pat. No. 6,266,462 referenced above.

Figure 3:
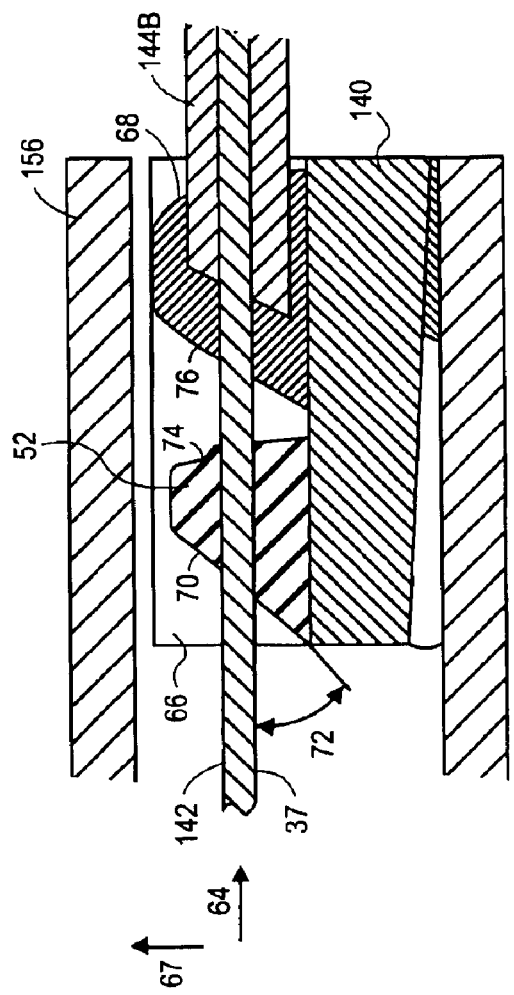
FIG. 3 is a cross-sectional side view of an end of the filter having a damper.
Figure 4:
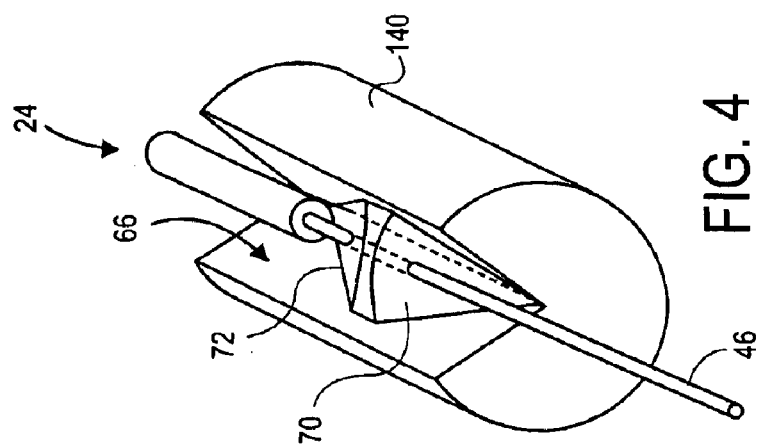
FIG. 4 is a perspective view of some of the components shown at the end shown in FIG. 3.

FIGS. 3 and 4 illustrate in more detail the filter in the region of the end 156. The end plug 140 has a generally circular shape. A V-notch groove 66 is formed in an axial direction along one side thereof. The optical fiber 142 is located in the V-notch groove 66 without touching the end plug 140. A section of the portion 144B of the jacket is located in the V-notch groove 66 and another section of the optical fiber 142 not covered by the jacket 144 is also located in the V-notch groove 66.

A resin 68 is located over the portion 144 of the jacket in the V-notch groove 66 and cured. The resin 68 is selected for its ability to securely attach the portion 144B of the jacket to the end plug 140.

The damper 52 is deposited through an open upper portion of the V-notch groove 66 over a portion of the optical fiber 142. The damper 52 is selected for its ability to absorb the waves in the optical fiber 142 and is made of silicone, having a refractive index substantially the same as the optical fiber 142. In another embodiment, the damper may be made from a porous material of a glass matrix containing voids. The air voids reduce the acoustic impedance of the glass itself, thereby reducing the ability of the glass to reflect a wave.

The damper 52 flows under capillary action and under gravity and is then cured so as to be longer in a base of the V-notch than above the optical fiber 142. The damper 52 has a slanted surface 70 on a side thereof facing towards the interaction length 37 and the transducer 134. As seen in FIG. 3, the slanted surface 70 extends continuously at an average angle 72 of about 5° (shown exaggerated) relative to a longitudinal axis of the optical fiber 142 from a base of the V-notch groove 66 to near the top of the V-notch groove 66. The optical fiber 142 has a longitudinal axis that extends in a direction 64. The optical fiber 142 extends into the continuously extending slanted surface 70. There is an acute oblique angle of 5° measured clockwise from the surface 70 to the direction 64 in an area above the optical fiber 142.

The damper 52 also has a slanted surface 74 on a side thereof opposing the transducer 134. The slanted surface 74 also extends at an angle of about 20° from a base of the V-notch groove 66 to near the top of the V-notch groove 66. There is an obtuse oblique angle of 160° measured counterclockwise from the surface 74 to the direction 64 above the optical fiber 142 and an acute oblique angle of 70° measured counterclockwise from the surface 74 to the direction 64 below the optical fiber 142.

Furthermore, the resin 68 has a surface 76 facing the damper 52 which extends at an angle of about 20° relative to the direction 64 of the longitudinal axis of the optical fiber 142. The surface 76 also extends continuously from a lower side of the optical fiber 142 to an upper side of the optical fiber 142 and is similar to the surface 70.

In another embodiment, it may be possible that these angles may be 5°, 10°, or even 15° from the present embodiment, while still providing at least some of the advantages of the angles of the present embodiment.

Because the surface 70 is at an angle other than 90° relative to a longitudinal axis of the optical fiber 142, the damper 52 is more effective in absorbing, and not reflecting, a wave traveling along the interaction length 37. Any reflections by the surface 70 will be away from the optical fiber 142 into the air above the optical fiber 142, but such reflection hardly occurs because of the large difference in the impedance between the optical fiber 142 and the air.

A portion of the wave may travel through the damper 52 to the surface 74. Such a portion of the wave is primarily dampened by the material of the damper 52. The surface 74 is also located at an angle other than 90° relative to the direction 64 of the longitudinal axis of the optical fiber 142. The angle of the surface 74 further assists in damping the wave because of the same reasons as the surface 70, and the angle of the surface 76 yet further assists in not reflecting any wave traveling from the surface 74 to the surface 76 because of the same reasons as the surface 70.

It can thus be seen that the surfaces 70, 74, and 76 more effectively dampen waves traveling through the optical fiber 142. Moreover, the surfaces 70 and 74 are easily formed by depositing the material of the damper 52, which flows under gravity and capillary action to form the surfaces 70 and 74.

Figure 5:
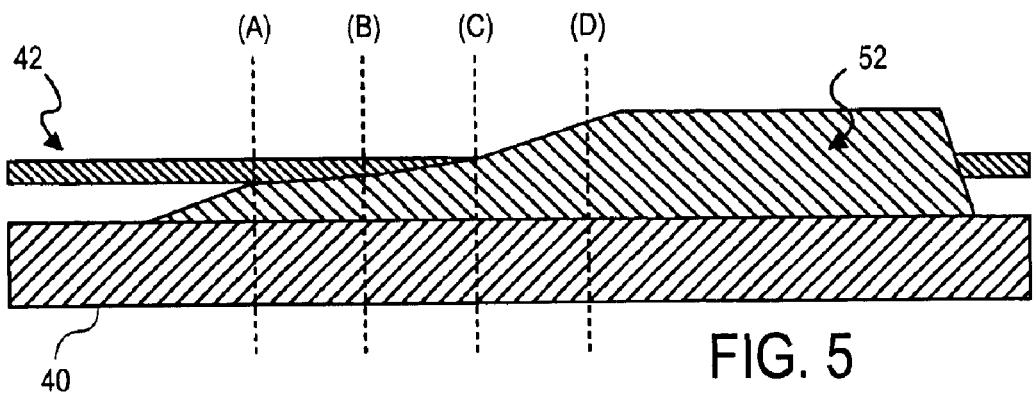
FIG. 5 is an enlarged side view of the damper.
Figure 6A:
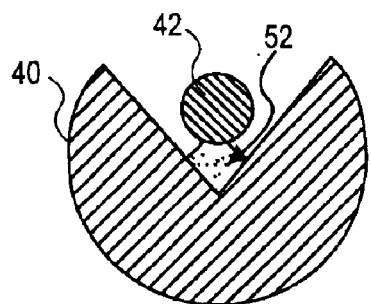
FIGS. 6A–D are cross-sectional end views at (a), (b), (c), and (d) in FIG. 5, respectively.
Figure 6B:
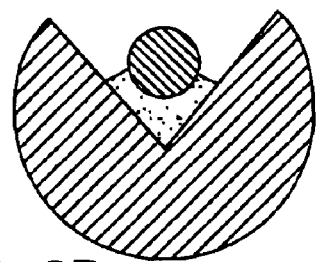
Figure 6C:
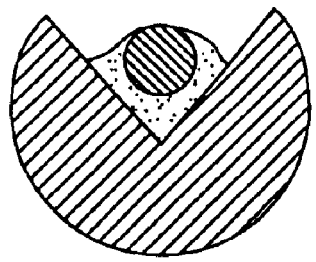
Figure 6D:
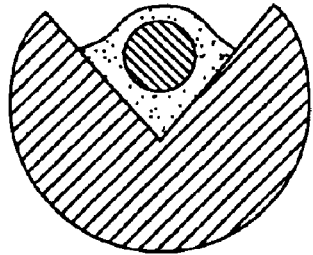

FIG. 5 shows the damper region in enlarged detail, and FIGS. 6A–D are cross-sections at (a), (b), (c) and (d), respectively. In the plane (a), the damper 52 touches the optical fiber 142 from the bottom. The surface where the surrounding damper 52 contacts the optical fiber 142 gradually increases through (b) and (c), and (d). The slant angle of damper 52 from the regions (a) to (c) is about 1–3 degrees. Therefore, the length of the region between (a) and (b) is about 5–10 mm This arrangement is effective in minimizing the back reflection of the wave, because the amount of perturbation on the wave, which is proportional to the mass load attached to the optical fiber, is small from the region (a) to (b).

Since the damper 52 touches only a fraction of the surface of the optical fiber 142, the amount of acoustic reflection at the entrance is small compared to the perpendicular surface. The reflectivity increases in proportion to the contact area of the damper, i.e., from (a) through (d), and the reflections effectively cancel one another out.

The damping characteristic is dependent upon the direction of the vibration of the wave with respect to the orientation of the damper structure. FIGS. 7A and 7B show two cases where the vibration direction of the acoustic wave is horizontal (FIG. 7A) and vertical (FIG. 7B) with respect to the interface between the damper 52 and optical fiber 142. The horizontal case as in FIG. 7A may be more desirable than the vertical case in FIG. 7B because the effective mass load in the case of FIG. 7A is smaller than the case FIG. 7B, thereby causing smaller back reflection.

In the case where it is important to attenuate cladding-mode light in the damper, it is preferred to match the refractive index of the damper 52, or at least a portion of the damper 52, to the refractive index of the cladding layer. Index-matching should be done within $10^{-3}$ difference.

FIGS. 8A and B illustrate another possible embodiment. A long narrow ridge support 40ii is located on top of a flat mount 40i. A damper 52iii is formed by injecting silicone between the optical fiber 142 and the narrow ridge 40ii. The material of the ridge 40ii is preferably a metal such as aluminum, for purposes of conducting heat. The functioning of the damper 52iii is similar to the damper of FIG. 7B. The material of the damper 52iii is preferably silicone with a refractive index substantially the same as the optical fiber 142.

Figure 9:
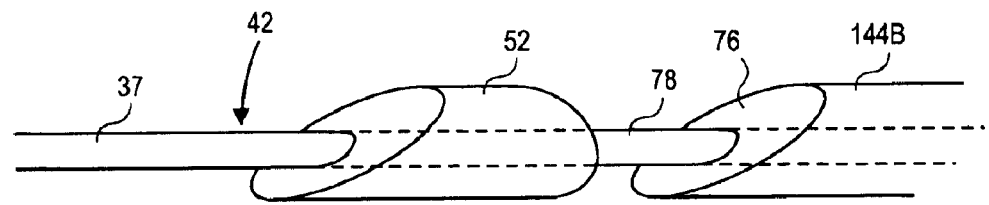
FIG. 9 is a perspective side view of an optical fiber, damper, and jacket shown in FIG. 3, further illustrating how they create three reflecting waves which cancel one another.

Further details, described hereafter, relate to cancellation of multiple back-reflected waves by destructive interference between them. As shown in FIG. 9, some of the wave traveling through the interaction length 37 is reflected, as represented by R1, because of the transition from the interaction length 37 to the damper 52. A further reflection, represented by R2, occurs at a transition in acoustic impedance from the damper 52 to a section 78 of the optical fiber 142 between the damper 52 and the portion 144B of the jacket. Yet a further reflection R3 occurs at a transition from the section 78 to the portion 144B of the jacket.

The reflections R2 and R3 can be used to cancel out reflection R1. The reflection R2 causes a reflected wave which is out of phase with a reflected wave caused by the reflection R1 and out of phase with a reflected wave caused by the reflection R3. The phase angles are chosen so that the magnitude of the vector sum of the waves due to reflections R1, R2, and R3 is zero. The phase of the wave created by the reflection R2 depends on the material of the damper 52 and the optical fiber 142 and can also be adjusted by adjusting the thickness and the length of the damper 52. Similarly, the phase of the reflection R3 depends on the material of the optical fiber 142 and its diameter, and can be adjusted by adjusting the length of the section 78.

The degree to which the waves caused by the reflections R2 and R3 cancel the wave R1 depends on the amplitudes of the reflected waves R2 and R3. The amplitudes of the reflected waves depend on the angles of the surfaces 70, 74, and 76 in FIG. 3, the materials of the optical fiber 142, damper 52, and jacket 144, and thicknesses of the damper 52 and jacket 144. These variables can all be altered to create a desired cancellation effect.

Figure 10:
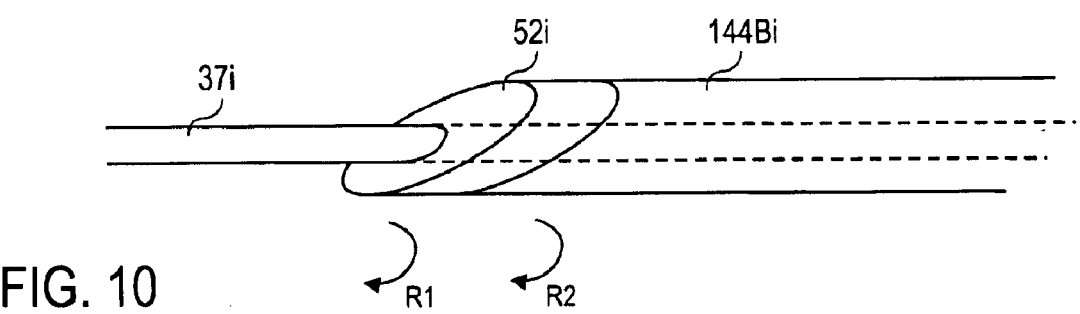
FIG. 10 is a perspective side view of an optical fiber having a damper and a jacket cause two reflected waves that cancel one another.

FIG. 10 illustrates how in another embodiment a cancellation effect can be created using two reflections. In the example given, a damper 52i is located directly against an end of a portion 144Bi of a jacket. Both the jacket 144Bi and the damper 52i have slanted surfaces which reduce reflection to a required degree. A first reflection R1 occurs at a transition from the interactive length 37i to the damper 52i, and a second reflection R2 occurs at a transition from the damper 52i to the portion 144Bi of the jacket. According to design, the phase of the wave due to the reflection R2 is out of phase relative to a wave created by the first reflection R1 by 180°. The materials of the damping material 52i and the portion 144Bi of the jacket can be selected so that an amplitude of a wave due to the reflection R1 is equal to an amplitude of a wave due to the reflection R2.

Figure 11:
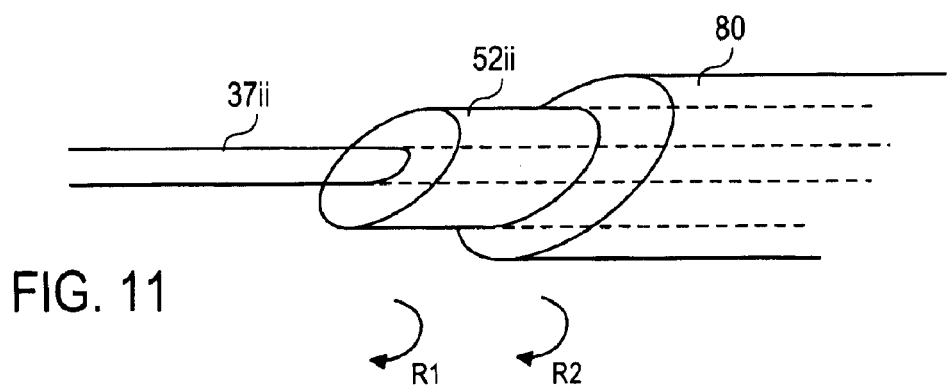
FIG. 11 is a perspective side view of an optical fiber, a damper, and another component having a larger diameter than the damper, wherein two reflecting waves are created.

FIG. 11 illustrates an embodiment with two reflections, R1 and R2 respectively. The first reflection R1 is caused due to a transition from a length 37ii to a damper 52ii. The second reflection R2 is caused due to a transition from a damper 52ii to a component 80 having a larger diameter than the damper 52ii. Both the damper 52ii and the component 80 have slanted surfaces to control an amplitude of a respective reflected wave. The component 80 may be a portion of a jacket, or the component 80 may be a portion of a resin used for attaching a jacket, or any other component.

Figure 12:
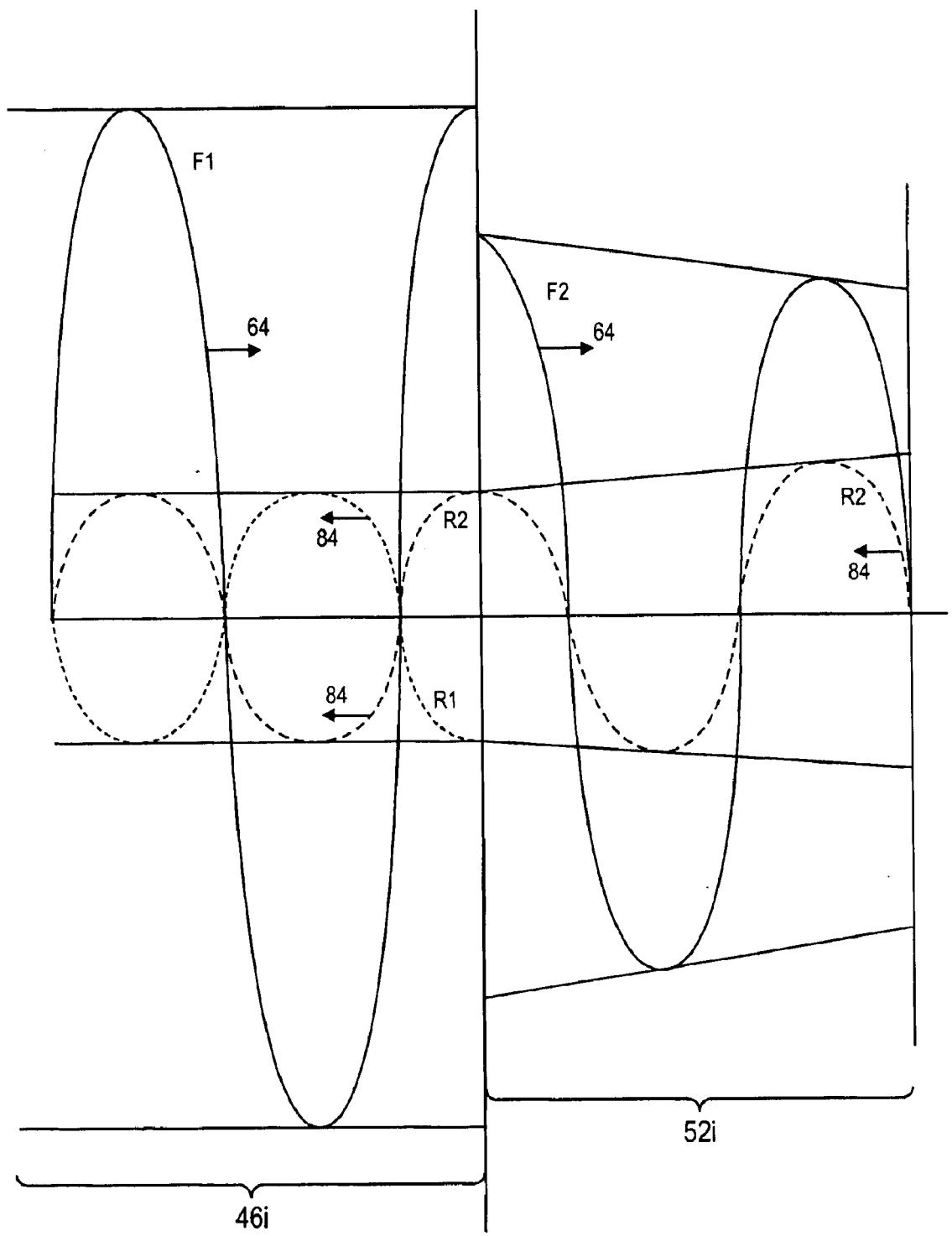
FIG. 12 is an illustration of waves traveling into, through, and out of the damper of FIG 10.

FIG. 12 illustrates waves as they travel through fibers and a double-reflection damper such as the double-reflection damper 52i shown in FIG. 10. A forward-traveling wave F1 travels in a direction 64 through the interaction length 37 of the fiber. The wave F1 is partially reflected in a direction 84, opposing the direction 64, as the reflected wave R1. An amplitude of the reflected wave R1 is typically about 1% of the amplitude of the forward-traveling wave F1.

A portion of the forward-traveling wave F1 also travels through the damper 52i as a forward-traveling wave F2. The forward-traveling wave F2 initially has an amplitude which is a fraction of the forward-traveling wave F1 and is then further dampened as it travels through the damper 52i. The forward-traveling wave F2 is then partially reflected in the direction 84 as the reflected wave of R2. An amplitude of the reflected wave R2 is initially approximately 2% of an amplitude of the forward-traveling wave F2 just before it is reflected. The reflected wave R2 is then further dampened while it travels in the direction 84 back through the damper 52i. When the reflected wave R2 enters the interaction length 37, the reflected wave R2 has an amplitude which is approximately equal to an amplitude of the reflected wave R1. The reflected waves R1 and R2 are 180° out of phase so that their sum substantially equals zero. The reflected wave R1 is thus cancelled by the reflected wave R2.

A number of factors contribute to the canceling of the reflected wave R1 by the reflected wave R2. These factors include the length and material of the damper 52i, the amount of reflection by surfaces of the damper 52i, and the amount of attenuation of the wave F1 at an interface of the damper 52i. The number of reflections, in this case two, also plays a role.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. An acousto-optic tunable filter comprising:
    an optical fiber having an interaction length;
    a wave generator coupled to the optical fiber and generating an acoustic wave in the optical fiber; and
    a damper located on the optical fiber with the interaction length between the wave generator and the damper, the damper having a planar proximal surface relative to the wave generator, the proximal surface continuously slanted relative to a longitudinal axis of the optical fiber.

2. The acousto-optic filter of claim 1 wherein the acoustic wave is a flexural wave.

3. The acousto-optic filter of claim 2 wherein the flexural wave has an amplitude in a y-direction and the proximal surface is at an acute angle relative to the y-direction.

4. The acousto-optic filter of claim 3 wherein the damper has a distal surface, relative to the wave generator, the distal surface continuously slanted relative to a longitudinal axis of the optical fiber.

5. The acousto-optic filter of claim 4 wherein reflections of the flexural wave by the proximal and distal surfaces respectively at least partially cancel one another out.

6. The acousto-optic tunable filter of claim 4 wherein the proximal surface of the damper is slanted at an angle ranging from approximately 1–20 degrees and wherein the distal surface of the damper is slanted at an angle ranging from approximately 5–35 degrees.

7. The acousto-optic filter of claim 1 wherein the damper is made of at least one of silicone and a porous material.

8. The acousto-optic filter of claim 1 wherein the mount has a groove and the fiber is located longitudinally in the groove such that a portion of the groove is below the fiber and a portion of the grove is above the fiber, the damper being deposited over the fiber within the groove and being longer, as measured in the direction in which the wave travels, in the portion of the groove below the fiber than in the portion of the groove above the fiber.

9. The acousto-optic filter of claim 1 wherein light couples from one optical mode to another in the fiber.

10. The acousto-optic filter of claim 9 wherein the interaction length has a core through which the light travels and a cladding into which the light couples due to the acoustic wave.

11. The acousto-optic filter of claim 10 wherein the damper has a refractive index substantially close to the refractive index of a layer of the cladding.

12. The acousto-optic filter of claim 9 wherein the proximal surface has a varying slope.

13. The acousto-optic filter of claim 12 wherein the optical fiber passes through a portion of the proximal surface and the portion of the proximal surface through which the optical fiber passes is slanted at a smaller angle than either a portion of the proximal surface above the optical fiber or a portion of the proximal surface below the optical fiber.

14. An acousto-optic filter comprising:

an optical fiber having an interaction length;

a wave generator coupled to the fiber and generating an acoustic wave in the optical fiber; and one or more dampers located on the optical fiber with the interaction length between the wave generator and the one or more dampers, such that the one or more dampers define a plurality of planar surfaces, the planar surface continuously slanted relative to a longitudinal axis of the optical fiber such that back reflections of the acoustic wave at least partially canceling out forward propagation of the acoustic wave.

15. The acousto-optic filter of claim 14 wherein the acoustic wave is a flexural wave.

16. The acousto-optic filter of claim 14 wherein the surfaces are first and second surfaces of a first damper respectively facing toward and away from a transducer.

17. The acousto-optic filter of claim 16 wherein a third surface is on a second damper and faces towards the second surface.

18. The acousto-optic filter of claim 14 wherein the first surface is at an oblique angle relative to the direction in which the wave travels.

19. The acousto-optic filter of claim 18 wherein the second surface is at an oblique angle relative to the direction in which the flexural wave travels.

20. A method of filtering light comprising:

transmitting a light through an optical fiber;

vibrating a first end of an interaction length of the fiber to generate an acoustic wave traveling through the interaction length; and damping the transverse wave with a damper at a second, opposing end of the interaction length, the damper having a first planar surface continuously slanted relative to a longitudinal axis of the optical fiber.

21. A method of filtering light comprising:

transmitting a light through an optical fiber;

vibrating a first end of an interaction length of the optical fiber to generate an acoustic wave traveling through the interaction length;

reflecting a first portion of the acoustic wave at a first location at a second, opposing end of the interaction length, back towards the first end; and reflecting a second portion of the acoustic wave at a second location, on a side of a first surface opposing the first end, back toward the first end, the portions of the acoustic wave reflected from the first and second locations at least partially canceling one another out.

* * * * *